: 3,734,829
Patented May 22, 1973

---

3,734,829
FERMENTATIVE PREPARATION OF L-ARGININE
Ichiro Chibata, Sakai, Masahiko Kisumi, Kobe, Jyoji Kato, Sakai, and Masaki Sugiura, Osaka, Japan, assignors to Tanabe Seiyaku Co., Ltd., Osaka, Japan
No Drawing. Filed Dec. 13, 1971, Ser. No. 207,576
Claims priority, application Japan, Dec. 25, 1970, 45/125,917
Int. Cl. C12d 13/06
U.S. Cl. 195—29    7 Claims

ABSTRACT OF THE DISCLOSURE

An arginine hydroxamate-resistant mutant of *Bacillus subtilis* is cultivated in an aqueous nutrient medium under aerobic conditions. 1 to 5 w./v. percent of glutamic acid may be optionally added to the medium. The cultivation is preferably carried out at about 25° to 37° C. and at a pH of 6 to 9. L-arginine is recovered from the fermentation broth.

---

This invention relates to the fermentative preparation of L-arginine.

It has been recognized in recent years that L-arginine is an important amino acid as an active ingredient of medicinal preparations. Known methods for the preparation of L-arginine may be divided into two groups. One is the method wherein extraction from protein hydrolysate is employed. The other is the method wherein chemical synthesis from L-ornithine is employed. The direct fermentation method for preparing L-arginine has long been desired but was not ready for application to commercial production up to now.

As a result of various investigations, we have now found that an arginine hydroxamate-resistant mutant of *Bacillus subtilis* has an excellent productivity of L-arginine in a nutrient medium. Additionally, we have found that the L-arginine productivity of the mutant can be further enhanced by carrying out the fermentation in the presence of glutamic acid.

According to the present invention, L-arginine can be prepared by cultivating an arginine hydroxamate-resistant mutant of *Bacillus subtilis* in a nutrient medium under aerobic conditions.

The arginine hydroxamate-resistant mutant of the present invention may be obtained by ultraviolet irradiation of a wild type strain of *Bacillus subtilis* or treating said wild type strain with a mutagen. For instance, a wild type strain of *Bacillus subtilis* is treated with N-methyl-N'-nitro-N-nitrosoguanidine and then cultivated at 30° C. for 2 to 3 days on agar plates containing the following compositions: $K_2HPO_4$, 1.4 w./v. percent; $KH_2PO_4$, 0.6 w./v. percent; $MgSO_4 \cdot 7H_2O$, 0.02 w./v. percent; $(NH_4)_2SO_4$, 0.2 w./v. percent; glucose, 0.5 w./v. percent; sodium citrate, 0.1 w./v. percent; L-arginine hydroxamate, 0.5 mg./ml. The arginine hydroxamate-resistant mutant of *Bacillus subtilis* may be isolated as large colonies. A viable culture of said mutant has been deposited with the American Type Culture Collection under No. 21742 and will be made freely available to the public upon issuance of a patent upon the present application.

The fermentation of an arginine hydroxamate-resistant mutant of *Bacillus subtilis* may be accomplished by either shaking cultivation or submerged fermentation under aerobic conditions. The fermentation may be preferably carried out at 25° to 37° C. The fermentation medium contains a source of carbon, a source of nitrogen and other elements. Suitable sources of carbon for the fermentation include glucose and starch hydrolysate. Examples of suitable sources of nitrogen are urea, ammonium salts of inorganic acids (e.g., ammonium chloride, ammonium sulfate). Preferred amount of the source of carbon and the source of nitrogen are respectively within the range of 5 to 15 w./v. percent and 0.1 to 2 w./v. percent. Furthermore, 0.2 to 3 w./v. percent of organic nutrients (e.g., corn steep liquor, casein hydrolysate, peptone, L-aspartic acid) and 0.01 to 2 w./v. percent of inorganic elements (e.g., potassium phosphate, magnesium sulfate) may be added to the medium. It is preferred to carry out the fermentation at a pH of 6 to 9. Calcium carbonate and ammonia may be employed for adjustment of the pH of the medium.

In carrying out the fermentation of the present invention, L-arginine productivity of the above-mentioned mutant may be further enhanced by addition of about 1 to 5 w./v. percent of L- or DL-glutamic acid. The fermentation of the invention can be accomplished in about 24 to 96 hours. L-arginine is accumulated in the fermentation broth.

After the fermentation is completed, cells and other solid culture compositions are removed from the fermentation broth by conventional procedures such as by heating, followed by filtration or centrifugation. Known procedures may be employed in the recovery and/or purification of L-arginine from the filtrate or the supernatant solution. For instance, the filtered fermentation broth is passed through or treated with a strong cation exchange resin. Then, the resin is eluted with a dilute alkaline solution such as aqueous ammonia. The eluates containing L-arginine are combined. After concentration, the solution is acidified with hydrohalogenic acid and then an alkanol such as methanol or ethanol is added to the solution. The precipitated crystals are recrystallized from an aqueous alkanol such as aqueous methanol or aqueous ethanol to yield pure crystals of L-arginine hydrohalide.

Practical and presently-preferred embodiments of the present invention are illustratively shown in the following examples.

EXAMPLE 1

An aqueous nutrient medium comprising the following ingredients is prepared:

|   | W./v. percent |
|---|---|
| L-glutamic acid | 2 |
| Glucose | 8 |
| Urea | 0.5 |
| Ammonium chloride | 0.3 |
| Corn steep liquor | 0.7 |
| Casein hydrolysate | 1.0 |
| Dibasic potassium phosphate | 0.2 |
| Magnesium sulfate | 0.01 |

The above medium is adjusted to pH 7.0. 30 ml. of the medium are charged into a 500 ml. shaking flask and its contents are sterilized by autoclaving. A loopful of the arginine hydroxamate-resistant mutant ATCC No. 21742 of *Bacillus subtilis* is inoculated aseptically into the medium. Then, the medium is cultivated for 72 hours at 30°C. under shaking. The fermentation medium thus obtained contains 5.4 mg./ml. of L-arginine.

1000 ml. of the fermentation medium are heated at 100° C. for 10 minutes and then filtered. The filtrate is introduced into a column (3 cm. x 45 cm.) of strong cation exchange resin (H-form) manufactured by Rohm & Haas Company under the trade name "Amberlite IR-120." After washing with water, the column is eluted with 5% aqueous ammonia. The fractions containing L-arginine are combined and concentrated to about 20 ml. The solution is acidified with hydrochloric acid. Then, 20 ml. of methanol is added to the solution. The precipitating crystals are collected by filtration and recrystallized from aqueous methanol. 4.9 g. of L-arginine hydrochloride are obtained. $[\alpha]_D^{20} + = 22.6°$ (C.=8, 6 N—HCl).

EXAMPLE 2

An aqueous nutrient medium comprising the following ingredients is prepared:

| | W./v. percent |
|---|---|
| Glucose | 8 |
| Urea | 1 |
| Ammonium sulfate | 0.5 |
| Corn steep liquor | 0.7 |
| Peptone | 1 |
| Dibasic potassium phosphate | 0.2 |
| Magnesium sulfate | 0.01 |
| Calcium carbonate | 2 |

The above medium is adjusted to pH 7.0. 30 ml. of the medium are charged into a 500 ml. shaking flask and its contents are sterilized by autoclaving. A loopful of the arginine hydroxamate-resistant mutant ATCC No. 21742 of *Bacillus subtilis* is inoculated aseptically into the medium. Then, the medium is cultivated for 72 hours at 30° C. under shaking. The fermentation medium thus obtained contains 3.5 mg./ml. of L-arginine.

EXAMPLE 3

An aqueous nutrient medium comprising the following ingredients is prepared:

| | | |
|---|---|---|
| Glucose | w./v. percent | 8 |
| L-glutamic acid | do | 2.5 |
| Ammonium chloride | do | 2.5 |
| Dibasic potassium phosphate | do | 0.35 |
| Monobasic potassium phosphate | do | 0.15 |
| Magnesium sulfate | do | 0.05 |
| Ferrous sulfate | do | 0.001 |
| Manganese sulfate | do | 0.001 |
| Calcium carbonate | do | 2 |
| Biotin | µg./l. percent | 20 |

The above medium is adjusted to pH 7.0. 30 ml. of the medium are charged into a 500 ml. shaking flask and its contents are sterilized by autoclaving. A loopful of the arginine hydroxamate-resistant mutant ATCC No. 21742 of *Bacillus subtilis* is inoculated aseptically into the medium. Then, the medium is cultivated for 48 hours at 30° C. under shaking. The fermentation medium thus obtained contains 12.3 mg./ml. of L-arginine.

What we claim is:

1. A process for preparing L-arginine which comprises cultivating an arginine hydroxamate-resistant mutant of *Bacillus subtilis* in a nutrient medium under aerobic conditions, and recovering accumulated L-arginine from the medium.

2. The process according to claim 1, wherein the mutant is *Bacillus subtilis* ATCC No. 21742.

3. The process according to claim 1, wherein the cultivation is carried out in the presence of 1 to 5 w./v. percent of L- or DL-glutamic acid.

4. The process according to claim 1, wherein the cultivation is carried out at about 25° to about 37° C.

5. The process according to claim 1, wherein the cultivation is carried out at a pH of 6 to 9.

6. The process according to claim 1, wherein the cultivation is carried out in the presence of 1 to 5 w./v. percent of L- or DL-glutamic acid at about 25° to 37° C. and at a pH of 6 to 9.

7. A process for preparing L-arginine which comprises cultivating arginine hydroxamate-resistant mutant ATCC No. 21742 of *Bacillus subtilis* in a nutrient medium containing 1 to 5 w./v. percent of L- or DL-glutamic acid under aerobic conditions at about 25° to about 37° C. and at a pH of 6 to 9, and recovering accumulated L-arginine from the meduim.

References Cited

The Merck index, 8th edition, p. 99 (1968).

ALVIN E. TANENHOLTZ, Primary Examiner

U.S. Cl. X.R.

195—47